(12) United States Patent
Carter et al.

(10) Patent No.: US 6,718,534 B1
(45) Date of Patent: Apr. 6, 2004

(54) SYSTEM FOR APPLICATION INDEPENDENT PROGRAMMING OF CONTROLS

(75) Inventors: Alan W. Carter, Bellevue, WA (US); Rajiv Kumar, Redmond, WA (US); Scott Michael Wiltamuth, Seattle, WA (US); Mei-Chin Tsai, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 09/678,561

(22) Filed: Oct. 3, 2000

Related U.S. Application Data

(63) Continuation of application No. 08/890,634, filed on Jul. 14, 1997, now abandoned.

(51) Int. Cl.[7] .................................................. G06F 9/44
(52) U.S. Cl. ....................... 717/100; 717/105; 717/108; 717/111; 717/116; 717/125
(58) Field of Search ................................. 717/123, 105, 717/116, 111, 108, 100; 709/315; 700/95; 703/4; 707/102

(56) References Cited

U.S. PATENT DOCUMENTS

| | | | |
|---|---|---|---|
| 4,775,950 A | 10/1988 | Terada et al. ................... | 703/15 |
| 4,860,291 A | 8/1989 | Damm et al. ................ | 714/744 |
| 5,051,938 A | 9/1991 | Hyduke ......................... | 703/15 |
| 5,126,966 A | 6/1992 | Hafeman et al. .............. | 703/16 |
| 5,278,769 A | 1/1994 | Bair et al. ....................... | 703/19 |
| 5,301,326 A | * 4/1994 | Linnett et al. ............... | 709/320 |
| 5,373,514 A | 12/1994 | Ma .............................. | 714/811 |
| 5,421,012 A | 5/1995 | Khoyi et al. ................. | 709/107 |
| 5,423,023 A | 6/1995 | Batch et al. ................. | 717/117 |
| 5,426,770 A | 6/1995 | Nuber .......................... | 703/15 |

(List continued on next page.)

OTHER PUBLICATIONS

Title: Toward active, extensible, networked documents: multivalent architecture and applications, Authors: Thomas A. Phelps and Robert Wilensky, ACM, 1996.*

(List continued on next page.)

*Primary Examiner*—Chameli C. Das
(74) *Attorney, Agent, or Firm*—Leydig, Voit & Mayer, Ltd.

(57) ABSTRACT

The present system for application independent programming of controls functions to provide a common set of controls across a plurality of application programs, such as those typically included in an office suite installed on a processor, while also enabling users to customize these controls for each application program. This is accomplished by producing an interface in the underlying common programming model which enables the user to access a set of controls, with their standard properties, methods and events, in a consistent manner. The user can then create a user defined control in a particular application program without having to replicate the underlying common programming model on which the customization is based. The user creates an extender file to add to and/or modify the standard properties, methods and events of a control to thereby produce an extended control for use in the selected application program. The system for application independent programming of controls merges, at run time, the standard control and the extender file to create the customized control. This enables users to create customized controls without having to replicate the common programming model and also enables consistency of control implementation. The control can also be uniformly updated across the plurality of application programs by simply updating the underlying control on which the customized instances are based.

29 Claims, 5 Drawing Sheets

U.S. PATENT DOCUMENTS

| | | | |
|---|---|---|---|
| 5,446,742 A | | 8/1995 | Vahabi et al. ............... 714/744 |
| 5,542,039 A | | 7/1996 | Brinson et al. ............. 345/800 |
| 5,544,285 A | | 8/1996 | Glaser et al. ............... 715/506 |
| 5,560,005 A | | 9/1996 | Hoover et al. ................ 707/10 |
| 5,574,893 A | | 11/1996 | Southgate et al. ............ 703/17 |
| 5,586,328 A | * | 12/1996 | Caron et al. ................ 717/146 |
| 5,600,778 A | | 2/1997 | Swanson et al. ............ 345/762 |
| 5,602,997 A | | 2/1997 | Carpenter et al. .......... 345/764 |
| 5,630,125 A | | 5/1997 | Zellweger ............... 707/103 R |
| 5,630,131 A | * | 5/1997 | Palevich et al. ............ 717/108 |
| 5,649,192 A | | 7/1997 | Stucky ................... 707/103 R |
| 5,652,884 A | * | 7/1997 | Palevich ........................ 713/1 |
| 5,659,740 A | | 8/1997 | Ezaki et al. ............ 707/103 R |
| 5,680,524 A | | 10/1997 | Maples et al. .............. 345/427 |
| 5,680,559 A | | 10/1997 | Chew et al. ................ 345/762 |
| 5,689,662 A | | 11/1997 | Nakajima et al. ........... 345/765 |
| 5,710,925 A | | 1/1998 | Leach et al. ................ 709/316 |
| 5,736,983 A | | 4/1998 | Nakajima et al. ........... 345/762 |
| 5,748,907 A | | 5/1998 | Crane ............................ 705/2 |
| 5,752,018 A | | 5/1998 | Sheffield ........................ 707/2 |
| 5,754,858 A | | 5/1998 | Broman et al. | |
| 5,778,378 A | | 7/1998 | Rubin .................... 703/103 R |
| 5,815,415 A | | 9/1998 | Bentley et al. ................ 703/4 |
| 5,815,712 A | | 9/1998 | Bristor et al. ............... 717/125 |
| 5,819,283 A | | 10/1998 | Turkowski .............. 703/103 R |
| 5,832,268 A | * | 11/1998 | Anderson et al. ........... 709/316 |
| 5,852,441 A | | 12/1998 | Nakajima et al. ........... 345/866 |
| 5,873,069 A | | 2/1999 | Reuhl et al. | |
| 5,884,097 A | | 3/1999 | Li et al. ....................... 710/43 |
| 5,892,900 A | * | 4/1999 | Ginter et al. ............... 713/200 |
| 5,903,905 A | | 5/1999 | Andersen et al. ........... 715/525 |
| 5,905,987 A | | 5/1999 | Shutt et al. ............. 703/103 R |
| 5,907,704 A | * | 5/1999 | Gudmundson et al. ..... 717/100 |
| 5,914,720 A | | 6/1999 | Maples et al. .............. 345/419 |
| 5,915,252 A | | 6/1999 | Misheski et al. ....... 703/103 R |
| 5,915,253 A | | 6/1999 | Christiansen ........... 707/103 R |
| 5,936,860 A | * | 8/1999 | Arnold et al. ................ 700/95 |
| 5,937,189 A | | 8/1999 | Branson et al. ............. 717/101 |
| 5,970,252 A | * | 10/1999 | Buxton et al. .............. 717/166 |
| 5,970,498 A | | 10/1999 | Duffield et al. .......... 707/104.1 |
| 6,059,838 A | * | 5/2000 | Fraley et al. ................ 717/108 |
| 6,209,040 B1 | * | 3/2001 | Acton et al. ................ 709/315 |
| 6,263,492 B1 | * | 7/2001 | Fraley et al. ................ 717/107 |
| 6,266,708 B1 | * | 7/2001 | Austvold et al. ........... 709/315 |
| RE37,722 E | * | 5/2002 | Burnard et al. ................ 713/1 |
| 6,384,933 B1 | * | 5/2002 | McGinnis et al. ......... 358/1.18 |
| 6,519,767 B1 | * | 2/2003 | Carter et al. ................ 717/140 |

OTHER PUBLICATIONS

Title: Building Application Generators, author: J. Craig Cleaveland, IEEE, Jul. 1988.*

Notkin et al., "Interconnecting Heterogeneous Computer Systems", Communications of ACM, vol. 31, No. 3 Mar. 1988.

Pratt, Terrence W., "Using GODIVA for Data Flow Analysis", ACM, 1998.

Penedo, "Acquiring Experience with Executable Process Models", IEEE, Feb. 1990.

Von Hoff, Arthur, "Java and Internet Programming", Dr. Dobb's Journal of Software Tools, vol. 20, No. 8, Aug. 1995.

* cited by examiner

SYSTEM FOR APPLICATION INDEPENDENT PROGRAMMING OF CONTROLS

CROSS REFERENCE TO RELATED APPLICATIONS

This is a continuation application No. 08/890,634, filed on Jul. 14, 1997 now abandoned.

This application is related to the U.S. patent application Ser. No. 08/892,684 titled "System for Instance Customization and Application Independent Programming of Controls" filed on Jul. 14, 1997, now U.S. Pat. No. 6,449,654 and the U.S. Pat. application Ser. No. 08/890,367 titled "System for Instance Customization" filed on Jul. 14, 1997, now U.S. Pat. No. 6,108,661.

FIELD OF THE INVENTION

This invention relates to processors that have a plurality of application programs installed thereon, each of which has their own internally defined set of controls. The system for application independent programming of controls functions to provide a common programming model across the plurality of application programs and components.

PROBLEM

It is a problem in application programs to provide a consistent programming model and functionality for the controls that are defined by a variety of application program and component vendors, as well as by individual users. This is because the application programs that are installed on a processor each have their own set of controls, which controls are typically inconsistent in their implementation across the plurality of application programs. This problem is especially relevant in an office suite type of environment on a personal computer, where there exists a common programming tool. The existence of the common programming tool raises users' expectations for a common programming model for using controls. Without specific support in the programming tool, it is extremely difficult to attain such a common programming model. Each application program in the office suite would need to provide its own implementation of the controls by embedding the controls, which are provided by the underlying common programming tool, into an extended control, which is implemented in the application program, to modify the properties, methods and events of the embedded controls. Duplicating this work in all applications would result in inconsistent interfaces and operation of controls as well as increased cost of implementation due to the replication of the control programmability function across the various application programs. In addition, the updating of an application program can change the controls embedded therein, further exacerbating the inconsistency of control implementation across the plurality of application programs.

Solution

The above described problems are solved by the present system for application independent programming of controls which functions to provide a common programming model for a set of controls used in a plurality of application programs, such as those typically included in an office suite, installed on a processor, while also enabling customization of these controls for each application program. This is accomplished by producing an interface in an underlying common programming tool which enables a host application program to augment the properties, methods and events provided by the underlying controls by adding "extender" properties, methods and in a consistent manner. The user can thus use a control in a variety of application programs, and have both a consistent experience as well as a customized experience—"consistent" in the sense that the functionality that is unique to the control is the same from application to application, and "customized" in the sense that behavior that is unique to the control container is different from application program to application program. All of this is accomplished without having to replicate the underlying control programmability function on which the customization is based. The host application program creates an extender file to add and/or modify the standard properties, methods and events of a control. The resulting extender file is later used to produce an extended control for use in this application program. The system for application independent programming of controls merges, at run time, the standard control and the extender file to create the customized control. This enables application programs to create and use customized controls without having to replicate existing control programmability functions and also enables consistency of control implementation. The control can also be uniformly updated across the plurality of application programs by simply updating the underlying control on which the customized instances are based.

The system for application independent programming of controls is implemented, for example, in the Visual Basic for Applications (VBA) module of the Microsoft Office suite of application programs. The Microsoft Office suite of application programs comprises a VBA layer (also termed Visual Basic layer) on which is overlaid a plurality of application programs, including: PowerPoint, Word, and Excel. The Visual Basic layer interconnects with an Object Linking and Embedding (OLE) layer which is interposed between the Visual Basic layer and the host operating system. The Microsoft Office suite of application programs uses the present system for application independent programming of controls to offer a controls interface which enables each of the application programs to access a common set of controls. Each user of the application programs can access the common set of controls and thence customize a control for use in a selected one of the application programs.

The customization of the control is created when the user takes actions that make it clear that they would like to use a specific control in a specific application program. This application program calls the controls interface of the Visual Basic layer which produces a type library entry to describe the properties, methods and events of the extended control that the user has created. This application program also maintains a type description extender library wherein an extender is an object which implements the extender properties and methods supplied by the application program. These properties and methods are typically specific to the application program, in the use of visual controls, for example, it is common for different application programs to present different mechanisms for positioning the visual controls. In a word processor, for instance, it might be useful to position controls relative to text characters. In a spreadsheet, it might be useful to position controls relative to cells in the spreadsheet. In other application programs it may be most appropriate to position controls using a two-dimensional coordinate system. Each application program may use the extender mechanism to provide its own, application program specific, properties and methods. In the case of control positioning in a two-dimensional coordinate system, this could mean providing Top and Left properties, for example. A pointer to the extender entry is returned from the application program to the Visual Basic controls interface as an output parameter to link the standard control in the Visual Basic layer and its customization definition as maintained in the application program. At run time, the system for application independent programming of controls operates on the type definitions of extenders maintained in the application program's standard library to implement the set of customized controls.

DETAILED DESCRIPTION

Figure 1:
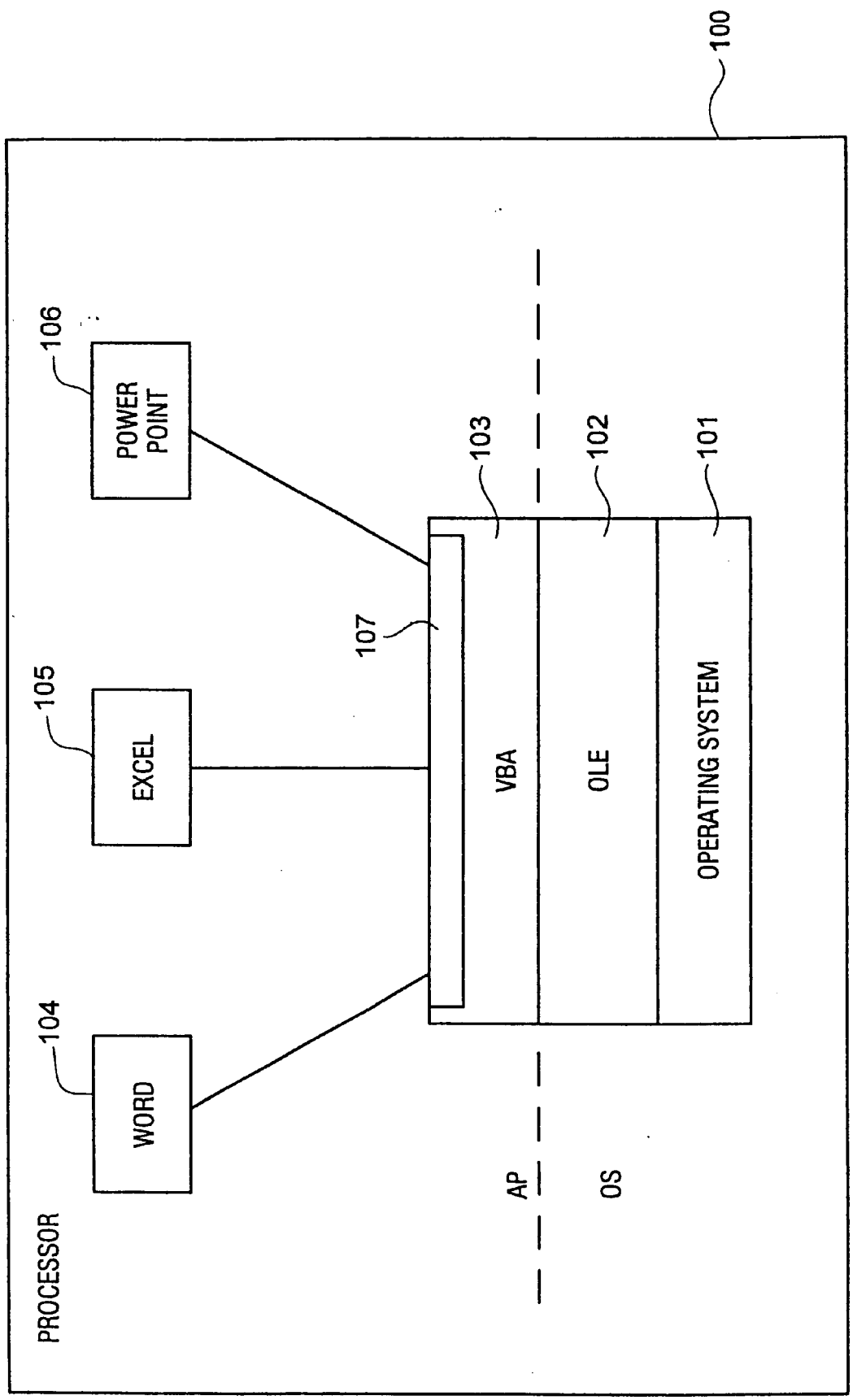
FIG. 1 illustrates in block diagram form a program hierarchy found in a typical processor.

In a preferred embodiment, the present system for application independent programming of controls functions to provide a common programming model for controls that are used in a plurality of application programs included in an office suite and to enable a user to customize these controls for each application program. This is accomplished by producing an interface in the underlying Visual Basic layer of the office suite which enables a selected application program to augment the properties, methods and events provided by the underlying controls by adding "extender" properties, methods and in a consistent manner. The user can thus use a control. In a variety of application programs, and have both a consistent experience as well as a customized experience—"consistent" in the sense that the functionality that is unique to the control is the same from application program to application program, and "customized" in the sense that behavior that is unique to the control container is different from application program to application program. All of this is accomplished without having to replicate the underlying control programmability function on which the customization is based.

The selected application program creates an extender file to add and/or modify the standard properties, methods and events of a control, The Visual Basic layer merges the user defined specific implementation of the control in a particular application program with these standard properties, methods and events of the underlying control to produce an extended control for use in the selected application program. The system for application independent programming of controls therefore produces a customized control which merges the underlying control's properties, methods and events with the properties, methods and events provided by the application program The resultant control is termed an extended control and comprises an object which is accessed programmatically.

Definitions

The following list of definitions provides a baseline characterization of a number of the descriptive terms used herein:

1. Type information includes a description of everything a client needs to know to use the services that are provided by an object. In addition, for each interface that an object supports, the object's type information includes a list of the methods and properties associated with the interface, along with a description of the parameters for those methods. A type library therefore comprises a collection of type information which represents a set of standardized descriptions of object interfaces.

2. Embedding is the function whereby information, such as a chart or an equation or spreadsheet data, is inserted in a document active in another application program, such as a Word document. Once embedded, the information, termed an object, becomes part of the Word document. When a user selects an embedded Word object, the CPU opens the application program in which the object was created and the object is displayed and ready for editing.

3. Container—When information from two separate pieces of software are combined in a compound document, one piece of software acts as the container and the other acts as the server. OLE allows a server to either embed its data in the container or link its data to the container. Embedding means that the server's data is stored in the same file as the containers data. With linking, the server's data remains in its own file and only a reference to that data is stored in the container's file.

4. Containment/Aggregation—comprises enclosing an object within another so that the inner object is used by the outer object exactly as any other client would use the inner object. Aggregation simply exposes a number of the inner objects' interfaces without requiring any intervening interfaces. For example, a control does not maintain properties and support methods that are relevant only to the container. For the container to package its own custom properties and methods in a control, so these properties and methods appear to be native to the control itself, an extended control must be created. The extended control is a partial control that wraps around another control through containment and aggregation to supply the extended functionality that the control itself knows,nothing about. Thus, the container provides its own extended control implementation that overrides specific interfaces on the control through containment and exposes the remaining interfaces through aggregation.

5. Control—A control is a user interface that transforms an external event, such as a mouse click, keystroke, telephone call, and the like, into a meaningful programmatic event. At the occurrence of a programmatic event, an event handler in a control container executes code, a command, or activates some element associated with the CPU. A control can also have no events and function to expose properties and methods. Thus, a control is a collection of functionality and content that is self-contained in that the control is independent of the application program in which it resides.

6. Event—An event is a mechanism that is used to extend and modify a control's behavior. An event is a stimulus which triggers the execution of event specific code and/or a mechanism through which the control notifies the container of events that occur within the control.

Software Architecture

FIG. 1 illustrates a typical software architecture 100 for a standard computer system, such as a personal computer, which architecture 100 includes the system for application independent programming of controls 107 of the present invention. As an illustration, the Microsoft Office suite comprises a Visual Basic layer 103 on which is overlaid a plurality of application programs, including: PowerPoint 106, Word 104, and Excel 105. The dotted line drawn horizontally across the middle of FIG. 1 illustrates the conceptual distinction between what is traditionally termed the operating system (OS) and what is traditionally termed the application program (AP) environment. The system for application independent programming of controls 107 is part of the Visual Basic layer 103. The Visual. Basic layer 103 interconnects with an Object Linking and, Embedding (OLE) layer 102 which is interposed between the Visual Basic layer 103 and the host operating system 101.

The application programs 104–106 use the system for application independent programming of controls 107 to offer a controls interface which enables each of the application programs 104–106 to provide a common programming model for controls which are maintained in the Visual Basic layer 103. Each user of the application programs 104–106 can access the common set of controls and thence customize a control for use in a selected one of the application programs. The customization of the control is implemented when the user designs a control in the selected application program and the application program calls the controls interface (system for application independent programming of controls 107) of the Visual Basic layer 103 which produces a type library entry to describe the properties, methods and events of the extended control that the user has created. The application program maintains a type description extender library, wherein an extender is an object which implements the extender properties and methods supplied by the application program, such as Top, Left, Color and the like. A pointer to the extender entry is returned from the application program to the system for application independent programming of controls 107 as an output parameter to link the standard control in Visual Basic 103 and its customization definition as maintained in the application program. The type definitions of extenders are part of the application program's standard library.

System for Application Independent Programming of Controls

Figure 2:
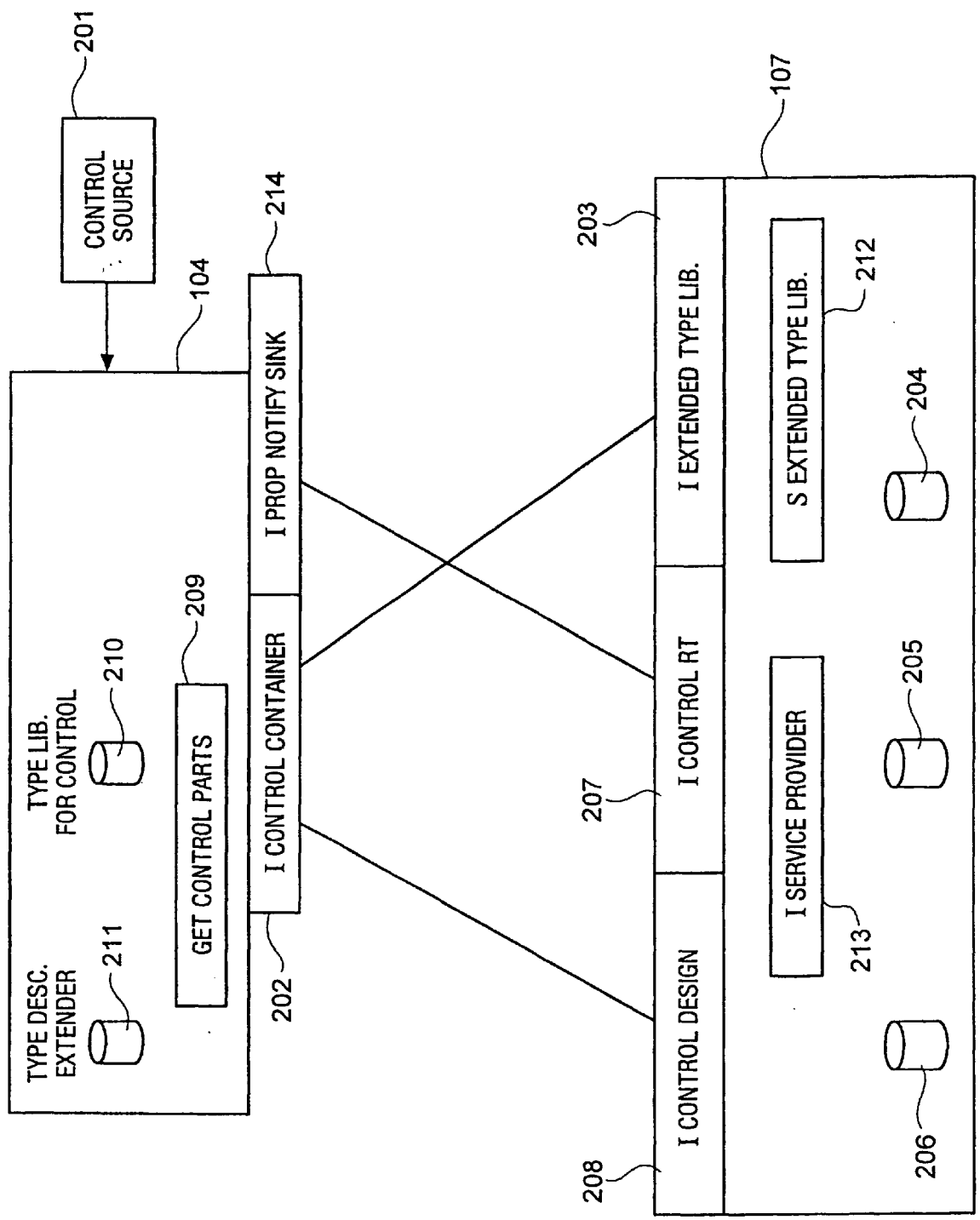
FIG. 2 illustrate the interrelation of various elements contained within the Visual Basic layer controls interface and the application programs that access this interface.
Figure 3A:
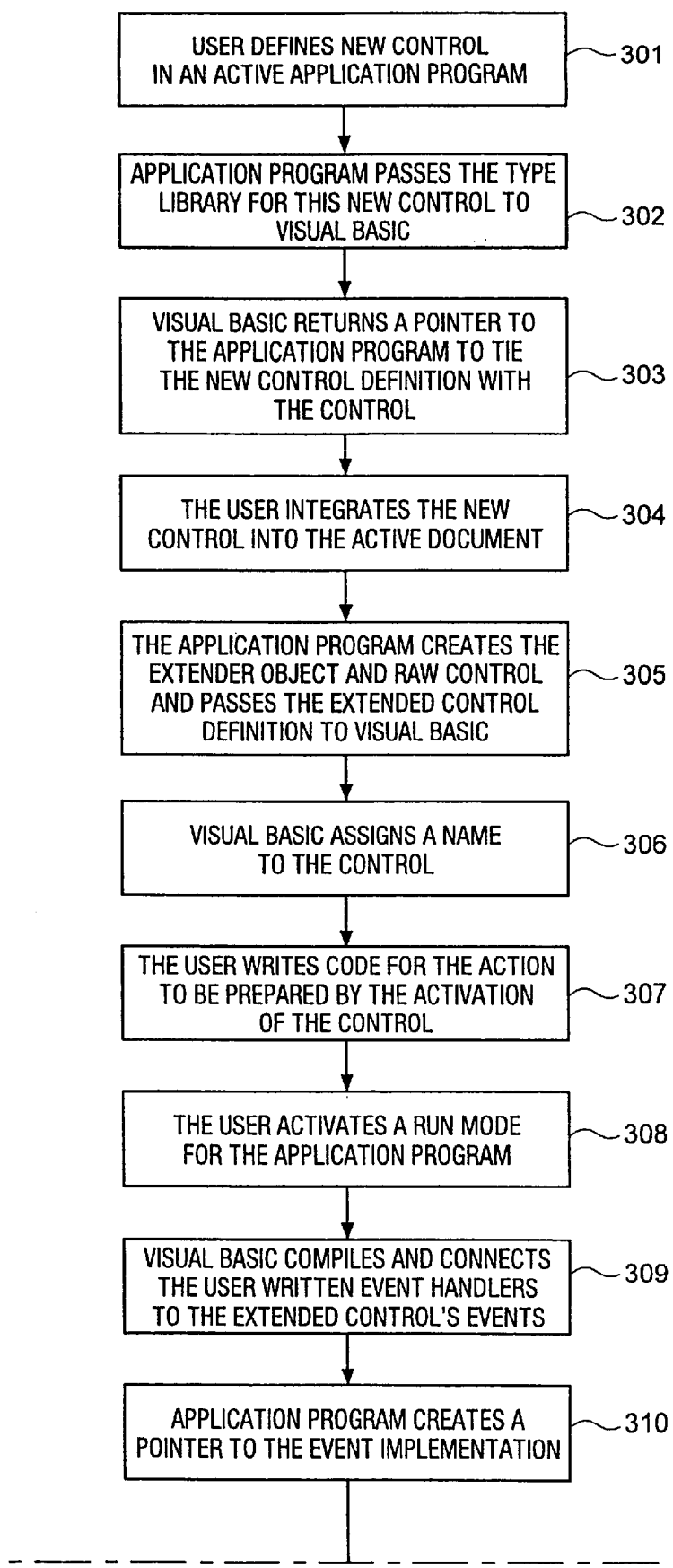
FIGS. 3A, 3B, and 3C illustrates in flow diagram form the operation of a typical application program which uses the present system for application independent programming of controls.
Figure 3B:
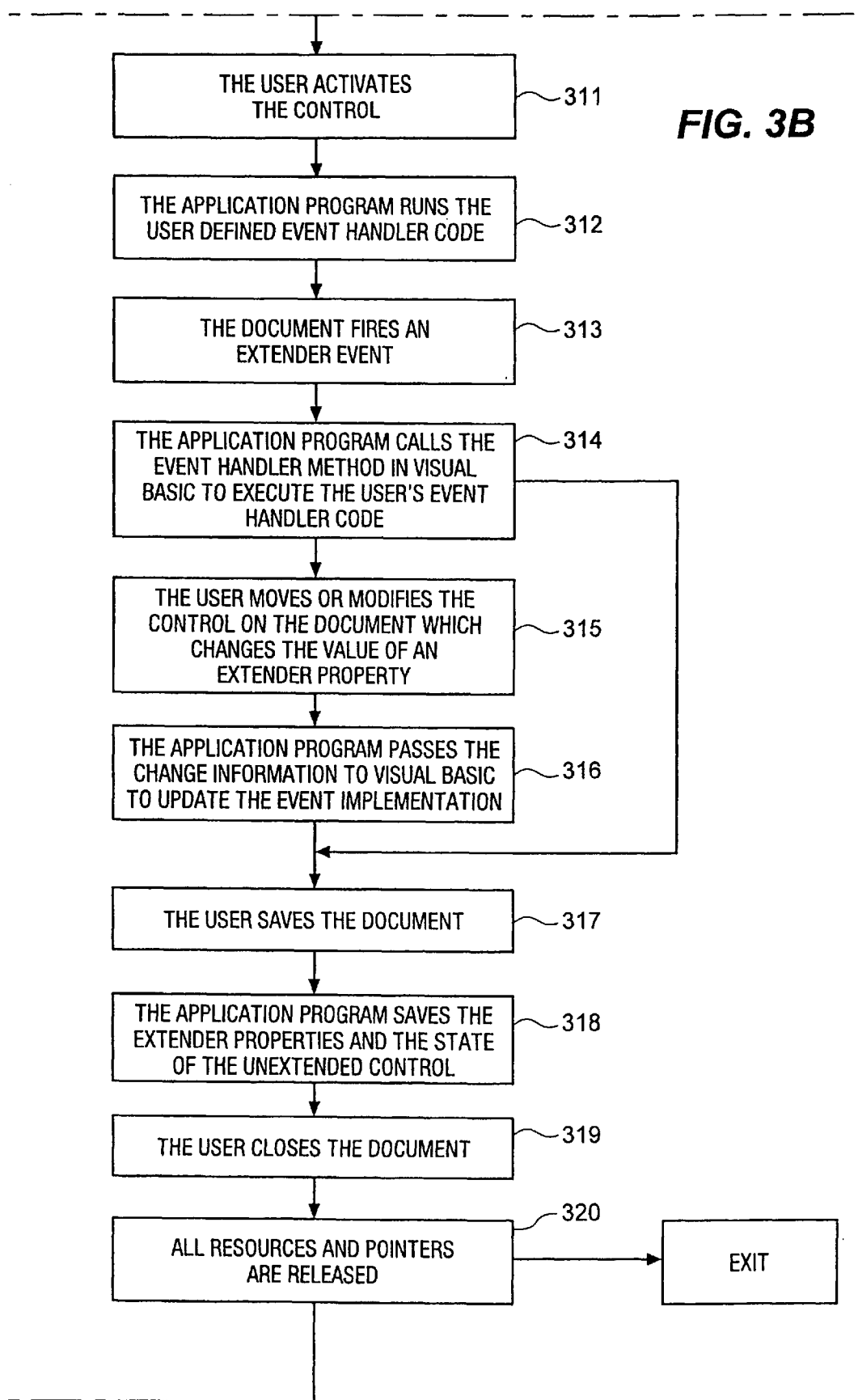
Figure 3C:
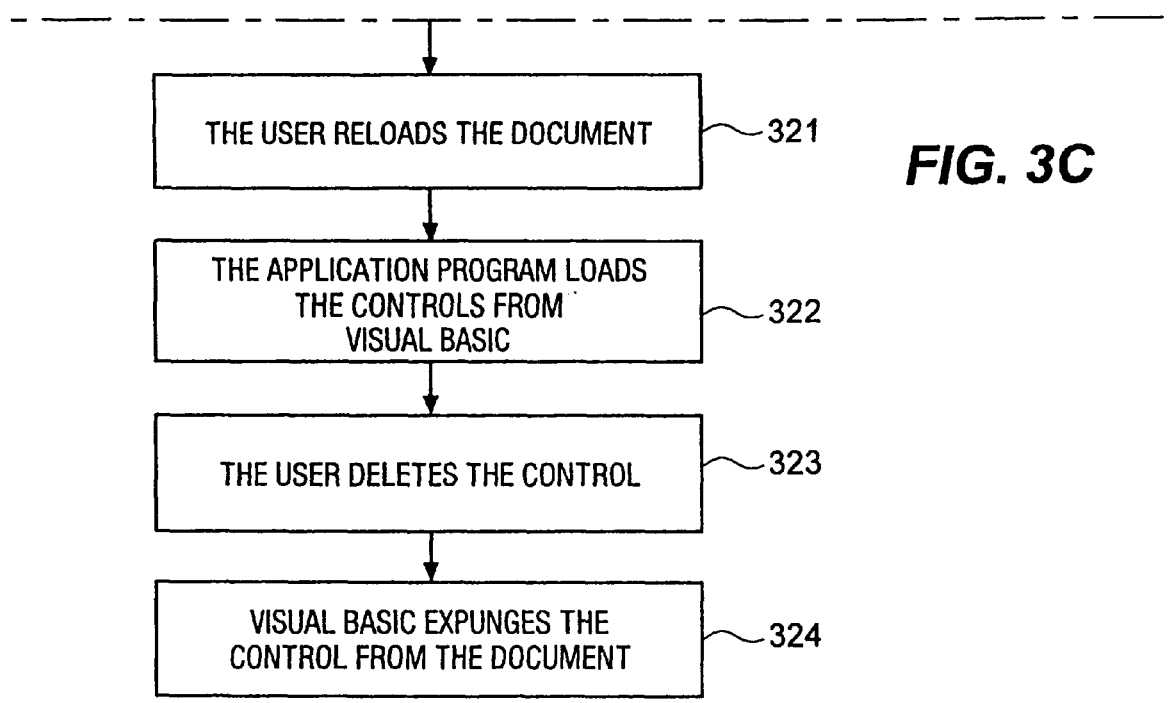

FIG. 2 illustrates various components of the system for application independent programming of controls 107 and the corresponding interface elements that are installed in a typical one of the application programs 104–106. For the purpose of simplicity of description, the Word application program 104 is selected as the example and FIGS. 3A, 3B and 3C illustrate in flow diagram form the operation of the system for application independent programming of controls 107 in this application environment. In particular, the example comprises the method of implementing a control on a document created in application program 104 and writing event handlers for the events associated with the control. The specific example is the creation of a button on a Word document and the programming of the click event associated with the button. To implement this function, each of the application program 104 and the system for application independent programming of controls 107 implements a plurality of interfaces (202, 214) and (203, 207, 208), respectively, to exchange data that is used to create libraries (210, 211) and (204–206), respectively, that are used to link the user defined specific implementation of the control in the selected application program 104 with the standard properties, methods and events of the underlying control from the Visual Basic layer 103 to thereby produce an extended control for use in the selected application program 104.

The method is initiated at step 301, when the user, in a selected application program (Word) 104 defines a new control. The user can import a control from an external source 201, or create a control by using the capabilities of Visual Basic 103. The user, in well known fashion, selects the image associated with the control and various characteristics of this image, including for example: color, size, location on the document, color and thickness of the border, and the like. The user's definition of the control creates a type library entry 210 in the application program 104 which stores information relating to the selections that the user has elected to define this control. The application program 104, at step 302, then calls the interface 203 IExtendedTypeLib in the system for application independent programming of controls 107 and passes ::AddRefExtendedTypeLib which contains the original type library 210 definition of the control that is referenced to this interface (203). This type library definition produces an extended type library 204 in the system for application independent programming of controls 107, which describes the properties, methods and events of the extended controls defined in the plurality of application programs 104–106. The extended type library 204 is therefore a container for type information which describes extended controls. It is necessary to come up with type information to describe the extended control for a variety of reasons, including compilation, browsing and "code behind objects".

In this regard, IExtendedTypeLib is an interface 203 which is provided by the SExtendedTypeLib service 212 of the system for application independent programming of controls 107. The IExtendedTypeLib interface 203 is called by the application program 104 to create a type library entry which describes the instances of extended controls. The primary parameters passed in ::AddRefExtendeTypeLib are the filename of the original type library 210 produced by the OLE Control (OCX) vendor and the TypeInfo 211 describing the set of extender properties, methods and events to be added to each control. AddRefExtendedTypeLib also adds a reference from the application program 104 to the extended type library 204 if it does not already exist. The extender 211 is therefore an object which implements the extender properties and methods supplied by the container (application program 104) such as Top, Left, Color and the like. At step 303, the pointer to the extender 211 is returned from the application program 104 as an output parameter of the interface 202 IControlContainer and contained in ::GetControlParts 209. The type definitions of extenders 211 are part of the application program's standard library.

An alternative to calling AddRefExtendedTypeLib, which requires that the application program 104 pass the filename of the original OCX library, is to call AddRefExtendedTypeLibOfClsid, which looks up the Class Identification (CLSID) of an OCX in the registry to determine the OCX library which contains its description. Instead of returning a TypeLib reference, AddRefExtendedTypeLibOfClsid returns a pointer to the extended TypeInfo of the control whose CLSID was passed in. This TypeInfo can then be passed by the application program 104 to the interface IControlDesign 208 using ::DefineControl. IControlDesign 208 is an interface implemented by the system for application independent programming of controls 107 and is used by the application program 104 to add controls to the document and remove them from the document. The IControlDesign interface 208 is accessed by the application program 104 via the IServiceProvider function 213 which is available on the system for application independent programming of controls 107. The IServiceProvider function 213 passes the identification of the requester and returns IControlDesignPointer::init(IControlContainer).

At step 304, the user places a button on the document. Before creating the control instance, the application program 104 notifies the system for application independent programming of controls 107 that it wants to add the control by calling the IControlDesign interface 208 using ::DefineControl and passing it the TypeInfo from the type library 210 which describes the extended control. In response to the call using DefineControl, the IControlContainer::GetControlParts method in the application program 104 is called. At this point (step 305), the application program 104 must create the extender object 211 and raw control and return the pointers to these objects to the system for application independent programming of controls 107 from GetControlParts 209. Creation of the raw control instance must wait until the function GetControlParts 209 is called, since the host processor needs to pass in the punkOuter for the extended control when creating the raw control. GetControlParts 209 must create the raw control and aggregate it into the extended control. GetControlParts 209 returns a pointer to the raw control and a pointer to the extender object 211 which implements the methods that the container wishes to extend the control with. In addition to the extender properties added by the document such as Visible, Top, Left, Color, etc., the controls programmability support adds in Name, Parent and Object properties. Even if the document were to add no extender properties, methods or events, these properties would still be added by Visual Basic 103.

IControlContainer interface 202 is implemented by all application programs which support controls programmability. For document customization, the IControlContainer interface 202 has three essential methods: one for initialization which is called to specify an implementation of the IControlRT interface 207, one for getting the parts of an extended control, and one for setting the interface pointer which the container calls to fire extender events. IControlRT interface 207 is an interface implemented by the system for application independent programming of controls 107 and it has one method which forces creation of a control instance which is used when reloading a document that contains customized controls. Before returning from GetControlParts 209, the host must addref the passed punkOuter pointer and cache it. When the document is destroyed, this pointer is released. Finally, the system for application independent programming of controls 107 at step 306 assigns a name to the control, such as button1, which name does not conflict with any other controls named in the document and is stored in name file 205.

At step 307, the user writes code for the defined button's click event and no action need be performed by the host. At step 308, the user clicks on the Run button for this application program 104 or performs an equivalent action which causes a transition of the document to the run mode. The system for application independent programming of controls 107 at step 309 compiles and connects the user-written event handlers to the extended control's events, The extended control calls IControlContainer interface 202 with ::SetExtenderEventSink, which passes a pointer to the implementation of the event sink for the extender events at step 310 and an implementation of IPropNotifySink for the host to send the change notifications for extender properties, The application program 104 calls the methods in the passed in interface in order to fire the extender events. When a call is made to an extender property or method, the extended control forwards this call to the punkExtender interface returned from GetControlParts 209.

At step 311, the user switches back to the document and clicks the button, causing the event handling code to be run. The button raises its click event which causes the user's code to be run at step 312. At step 313, an action occurs in the document which causes an extender event to be fired. The application program 104 calls the event handler method in the interface in the system for application independent programming of controls 107 that is set by the interface IControlContainer::SetExtenderEventSink. This causes the user's event handler code to be executed.

User Changes the Document

At step 315, the user moves a control on the document. This changes the value of an extender property of the control and the application program 104 must call the interface IPropNotifySink 214 with ::OnChanged which contains the DISPID of the property being passed at step 316 to the interface IControlContainer 202 via ::SetExtenderEventSink. At step 317, the user saves the document. When the application program 104 at step 318 saves the project associated with the document, the state of the properties which are added by the system for application independent programming of controls 107 are saved by application program 104 as part of the project state. The document is responsible for saving the extender properties in file 211 that it provides as well as saving the state of the unextended control. At step 319, the user closes the document. As part of releasing the resources of the document, the document releases its pointer to the outer unknown of the control at step 320.

User Reloads Document

At step 321 the user reloads the document. The application program 104 at step 322 creates the extension instance associated with this document then calls the interface IControlRT 207 with ::ForceControlCreation as it loads the controls. ForceControlCreation calls back to the application program 104 via the interface IControlContainer 202 to ::GetControlParts 209, which must create and deserialize the control. Ultimately, at step 323 the user deletes the control from the document and the container calls the interface IControlDesign 208 with ::UndefineControl and the system for application independent programming of controls 107 expunges the extended control implementation at step 324.

Summary

A user generates a control for a selected application program in Visual Basic by means of a draw tool and the creation of the code used to implement the event functions provided by the control. The system for application independent programming of controls 107 functions to integrate the raw control and the extender object with the standard control resident in the system for application independent programming of controls 107. This also ensures the same programming model is presented in different application programs. This provides ease of implementation of the controls in any multi-application program environment, such as an office suite containing applications of differing function, such as Office which contains the application programs PowerPoint, Word, Excel.

We claim:

1. In a computer system, which comprises a host processor having an operating system that presents an interface to a plurality of application programs installed on the host processor, a method for providing users with a capability for providing controls in plurality of application programs, where a control provides properties in at least one of the plurality of application programs acting on a document object, comprising the steps of:

storing data, external to the plurality of application programs, that defines a plurality of controls;

providing a programming layer, for the plurality of application programs, that enables users to create an application program specific control, which provides properties for the document object, by inputting control customization data comprising control extender data for a selected one of the plurality of controls, into a selected one of the plurality of application programs; and using a container corresponding to the application program to merge control extender data associated with the one of the plurality of application program with the selected one of the plurality of controls to form the application program specific control without recompiling the application program.

2. The method of claim 1 wherein the step of merging comprises:

compiling at run time the user input control customization data with the selected one of the plurality of controls to create the application program specific control.

3. The method of claim 1 wherein the step of providing comprises:

storing control customization data comprising a definition of an appearance and location of the application specific control in a selected document in the selected one of the plurality of application programs; and storing control customization data comprising programmatic event data comprising at least one of executable code, an executable command, identification of some activatable element associated with the computer system.

4. The method of claim 3 further comprising:

displaying the appearance of the application specific control at the location in the selected document in the selected one of the plurality of application programs; and executing the programmatic event defined by the stored programmatic event data in response to a user activating the application specific control.

5. The method of claim 1 further comprising the steps of:

creating a control container in the selected one of the plurality of application programs; and creating at least one container in the programming layer which interconnects with the control container in the selected one of the plurality of application programs for exchanging data therebetween.

6. The method of claim 1 wherein the step of providing comprises:

defining a set of extender properties and methods for the application specific control in a selected document in the selected one of the plurality of application programs; and transmitting a pointer from the control container in the selected one of the plurality of application programs to a container in the programming layer, the pointer identifying an extender type library entry in the selected one of the plurality of application programs that contains the set of extender properties and methods.

7. The method of claim 1 wherein the step of providing further comprises:

linking the pointer to the selected one of the plurality of controls.

8. The method of claim 1 wherein the step of providing further comprises:

storing in the selected document in the selected one of the plurality of application programs a set of event handlers comprising code executable in response to activation of the control by a user.

9. The method of claim 1 wherein the step of providing further comprises transmitting a pointer from the control container in the selected one of the plurality of application programs to a container in the programming layer, the pointer identifying the set of event handlers.

10. The method of claim 1 wherein the step of merging comprises:

accessing, in the programming layer, the set of extender properties and methods via the extender type library entry in the selected one of the plurality of application programs that contains the set of extender properties and methods;

accessing, in the programming layer, the set of event handlers stored in the selected document in the selected one of the plurality of application programs; and compiling the set of event handlers, the set of extender properties and methods, the selected one of the plurality of controls to create the application program specific control for the selected one of the plurality of application program.

11. In a computer system, which comprises a host processor having an operating system and a plurality of application programs installed on the host processor, a method for providing a document object specific control programming capability to users of the plurality of application programs, where a control provides properties in at least one of the plurality of application programs acting on the document object, comprising the steps of:

providing a Visual Basic module in computer system;

implementing a controls generation system in the Visual Basic module;

storing data in the controls generation system that defines a plurality of controls, which provide properties for the document object;

coupling an application program from the plurality of application programs to the controls generation system;

enabling users to create a control for the application program by inputting control customization data comprising control extender data from the application program; and using a container corresponding to the application program to merge control extender data associated with the application program with the selected one of the plurality of controls to form the application program specific control without recompiling the application program.

12. The method of claim 11 wherein the step of merging comprises:

compiling, in the Visual Basic controls generation module at run time, the user input control extender data with the selected one of the plurality of controls to create the application program specific control.

13. The method of claim 11 wherein the step of enabling comprises:

storing control extender data comprising a definition of an appearance and location of the application specific control in a selected document in the selected one of the plurality of application programs; and storing control extender data comprising programmatic event data comprising at least one of executable code, an executable command, identification of an activatable element associated with the computer system.

14. The method of claim 13 further comprising:

displaying the appearance of the application specific control at the location in the selected document in the selected one of the plurality of application programs; and executing the programmatic event defined by the stored programmatic event data in the selected one of the plurality of application programs in response to a user activating the application specific control.

15. The method of claim 11 further comprising the steps of:

creating a control container in the selected one of the plurality of application programs; and creating at least one container in the controls generation system which interconnects with the control container in the selected one of the plurality of application programs for exchanging data therebetween.

16. The method of claim 11 wherein the step of enabling comprises:

defining a set of extender properties and methods for the application specific control in a selected document in the selected one of the plurality of application programs; and transmitting a pointer from the control container in the selected one of the plurality of application programs to a container in the controls generation system, the pointer identifying an extender type library entry in the selected one of the plurality of application programs that contains the set of extender properties and methods.

17. The method of claim 11 wherein the step of enabling further comprises:

linking the pointer to the selected one of the plurality of controls.

18. The method of claim 11 wherein the step of enabling further comprises:

storing in the selected document in the selected one of the plurality of application programs a set of event handlers comprising code executable in response to activation of the control by a user.

19. The method of claim 11 wherein the step of enabling further comprises:

transmitting a pointer from the control container in the selected one of the plurality of application programs to a container in the controls generation system, the pointer identifying the set of event handlers.

20. The method of claim 11 wherein the step of merging comprises:

accessing, in the controls generation system, the set of extender properties and methods via the extender type library entry in the selected one of the plurality of application programs that contains the set of extender properties and methods;

accessing, in the controls generation system, the set of event handlers stored in the selected document in the selected one of the plurality of application programs; and compiling, in the controls generation system, the set of event handlers, the set of extender properties and methods, the selected one of the plurality of controls to create the application program specific control for the selected one of the plurality of application programs.

21. A method of providing an extended control, the extended control adding a property and/or behavior and/or handling events, in one of a plurality of application programs acting on a document object, each of the plurality of programs having access to a common programming tool via a controls programming interface, the method comprising:

using a plurality of interfaces, each interface in the plurality of interfaces including a pointer to a table of pointers and wherein, furthermore, at least one pointer in the table of pointers accesses a function for discovering additional interfaces;

providing, for the application, at least one of the plurality of interfaces;

providing a plurality of controls, which provide properties for the document object, in association with the application programming layer, wherein furthermore each of the controls corresponds to at least one of the plurality of interfaces;

providing a plurality of extender objects in association with the application program wherein furthermore each of the extender objects corresponds to at least one of the plurality of interfaces and wherein furthermore at least one of the plurality of extender objects adds properties, methods, or events to a chosen control through corresponding interfaces; and using a container corresponding to the application to merge a first extender object associated with the application program with a first control from the plurality of controls using the interfaces from the plurality of interfaces associated with the first control and the first extender object to form a first extended control without recompiling the application program.

22. The method of claim 21 wherein the common programming tool includes visual basic.

23. The method of claim 21 wherein furthermore the step of using includes merging user provided code for handling events as an extender object, with the first extender object and the first control in the container corresponding to the application to form the extended control.

24. The method of claim 21 further having the step of calling, by the application, in response to a change in the user provided code in the extended control, the common programming tool through the application's controls programming interface to change the first extender object to a second extender object corresponding to the changed user provided code; and merging the second extender object and the first control in the application functioning as a container to form the changed extended control.

25. The method of claim 21 further having the step of calling, by the application, responsively to a deletion of the extended control by the user, the common programming tool through an interface, from the plurality of interfaces, the interface corresponding to the application program to delete the extended control.

26. The method of claim 21, wherein, furthermore, the step of using a plurality of interfaces is restricted to interfaces compliant with the component object model (COM).

27. A computer-readable medium containing computer executable instructions for carrying out the steps in a method for providing an extended control in one of a plurality of application programs having access to a common programming tool via a controls programming interface, where the extended control provides properties in at least one of the plurality of application programs acting on a document object, the method comprising steps of:

using a plurality of interfaces, each interface in the plurality of interfaces comprising a pointer to a table of pointers pointing to the location of objects and wherein furthermore at least one pointer in the table of pointers accesses a function object for discovering interfaces;

providing, for the application, at least one of the plurality of interfaces;

providing a plurality of controls in association with the common programming tool, wherein furthermore each of the controls corresponds to at least one of the plurality of interfaces;

providing a plurality of extender objects in association with the application program wherein furthermore each of the extender objects corresponds to at least one of the plurality of interfaces and wherein furthermore at least one of the plurality of extender objects add properties, methods, or events to a chosen control through corresponding interfaces; and using a container corresponding to the application to merge a first extender object associated with the application program from the application with a first control from the plurality of controls using the interfaces from the plurality of interfaces associated with the first control, the first extender object and the application to form a first extended control, where the first extended control provides customized properties to the document object without recompiling the application program.

28. The computer-readable medium of claim 27, having computer executable instructions for carrying out the step of calling, by the application, responsively to a deletion of the extended control by the user, the common programming tool through an interface, from the plurality of interfaces, the interface corresponding to the application program to delete the extended control.

29. The computer-readable medium of claim 27, having computer executable instructions for carrying out the steps of calling, by the application, responsively to a change in the user provided code in the extended control, the common programming tool through the controls programming interface to change the first extender object to a second extender object corresponding to the changed user provided code; and merging the second extender object and the first control in the application functioning as a container to form the extended control.

* * * * *